(12) United States Patent
Miwa et al.

(10) Patent No.: US 10,532,622 B2
(45) Date of Patent: Jan. 14, 2020

(54) SUSPENSION DEVICE

(71) Applicants: KYB Corporation, Tokyo (JP); HONDA MOTOR CO., LTD., Tokyo (JP); Sumitomo Riko Company Limited, Aichi (JP)

(72) Inventors: Masahiro Miwa, Gifu (JP); Kazuma Ando, Gifu (JP); Yasutaka Ohta, Tochigi (JP)

(73) Assignees: KYB Corporation, Tokyo (JP); HONDA MOTOR CO., LTD., Tokyo (JP); Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 15/562,413

(22) PCT Filed: Mar. 30, 2016

(86) PCT No.: PCT/JP2016/060476
§ 371 (c)(1),
(2) Date: Sep. 27, 2017

(87) PCT Pub. No.: WO2016/159129
PCT Pub. Date: Oct. 6, 2016

(65) Prior Publication Data
US 2018/0086166 A1    Mar. 29, 2018

(30) Foreign Application Priority Data
Mar. 31, 2015 (JP) .................................. 2015-072912

(51) Int. Cl.
*B60G 11/16* (2006.01)
*F16F 1/12* (2006.01)
(Continued)

(52) U.S. Cl.
CPC .............. *B60G 11/16* (2013.01); *B60G 15/06* (2013.01); *F16F 1/126* (2013.01); *F16F 9/36* (2013.01); *B60G 2204/1242* (2013.01)

(58) Field of Classification Search
CPC ........ B60T 11/16; B60T 15/06; B60T 15/062; B60T 15/063; F16F 1/12; F16F 1/122; F16F 1/126
(Continued)

(56) References Cited

U.S. PATENT DOCUMENTS 3,797,852 A * 3/1974 Patterson .................. B60G 3/06
280/124.151
5,421,565 A * 6/1995 Harkrader .............. B60G 11/16
267/153

(Continued)

FOREIGN PATENT DOCUMENTS

GB        2241765 B  *  2/1994  .......... B60G 15/063
JP    2004-216922 A        8/2004
(Continued)

OTHER PUBLICATIONS

International Search Report in PCT/JP2016/060476, dated May 17, 2016, 5pp.

*Primary Examiner* — Thomas J Williams
(74) *Attorney, Agent, or Firm* — Hauptman Ham, LLP

(57) ABSTRACT

A rubber sheet includes: a main body formed into an arc shape or an annular shape; a seating portion formed into a groove shape at the main body, a coil spring being configured to be seated on the seating portion; and a deformation restricting portion formed to project outside in a radial direction from an outer periphery of the main body at a position, on which a terminal portion of the coil spring is seated, of the main body, the deformation restricting portion being configured to restrict deformation of the main body.

5 Claims, 6 Drawing Sheets

(51) Int. Cl.
*B60G 15/06* (2006.01)
*F16F 9/36* (2006.01)

(58) Field of Classification Search
USPC .................... 267/221; 280/124.162, 124.179
See application file for complete search history.

(56) References Cited

U.S. PATENT DOCUMENTS

| | | | | |
|---|---|---|---|---|
| 6,079,700 | A * | 6/2000 | Solomond | B60G 15/063 |
| | | | | 267/221 |
| 6,398,201 | B1 * | 6/2002 | Solomond | B60G 15/063 |
| | | | | 267/170 |
| 2014/0265081 | A1 * | 9/2014 | Nakano | B60G 11/16 |
| | | | | 267/220 |
| 2016/0031280 | A1 * | 2/2016 | Arano | B60G 11/16 |
| | | | | 267/219 |
| 2017/0080768 | A1 * | 3/2017 | Ando | B60G 15/063 |
| 2018/0105003 | A1 * | 4/2018 | Miwa | B60G 11/16 |
| 2018/0105004 | A1 * | 4/2018 | Miwa | B60G 11/16 |

FOREIGN PATENT DOCUMENTS

| | | |
|---|---|---|
| JP | 2012-219825 A | 11/2012 |
| JP | 2013-185670 A | 9/2013 |
| JP | 2014-199134 A | 10/2014 |

\* cited by examiner

SUSPENSION DEVICE

RELATED APPLICATIONS

The present application is a National Phase of International Application No. PCT/JP2016/060476, filed Mar. 30, 2016, and claims priority based on Japanese Patent Application No. 2015-072912, filed Mar. 31, 2015.

TECHNICAL FIELD

The present invention relates to a rubber sheet and a suspension device.

BACKGROUND ART

JP2012-219825A discloses a suspension that includes a coil spring, a spring receiving member, and a spring rubber sheet. The coil spring is externally mounted on a shock absorber. The spring receiving member supports a lower end part of this coil spring and is fixed to a middle portion of the shock absorber. The spring rubber sheet is interposed between this spring receiving member and the lower end part of the coil spring.

At the suspension described in JP2012-219825A, a protrusion is formed at an inside part in a radial direction of the spring receiving member. This protrusion has an upper end portion on which a deformation restricting portion formed at the spring rubber sheet abuts. The deformation restricting portion is formed at a position corresponding to an uppermost part of the coil spring lower end part that contacts a seating portion.

At the suspension described in JP2012-219825A, the lower end part of the coil spring presses a top surface part of the seating portion of the spring rubber sheet. Thus, caused by compression of the seating portion, stress to curve and deform a fitted portion of the spring rubber sheet outside in a radial direction acts. At this time, the deformation restricting portion has a lower portion that abuts on a top end surface of the protrusion of the spring receiving member. Thus, friction force between both restricts the curvature deformation to the outside in the radial direction of the fitted portion.

SUMMARY OF INVENTION

However, when the coil spring performs contraction operation, load acts on the terminal portion of the coil spring toward the outside in the radial direction. The spring rubber sheet has a portion that supports the terminal portion of the coil spring. When large load acts on the terminal portion of the coil spring, this portion of the spring rubber sheet possibly deforms as twisting toward the outside in the radial direction. If the spring rubber sheet deforms as described above, the coil spring is possibly removed from the spring rubber sheet. Thus, the spring rubber sheet possibly fails to stably support the coil spring.

The present invention has been made in view of such technical problem, and it is an object of the present invention to provide a rubber sheet that ensures stable support of a coil spring.

According to a certain aspect of the present invention, the rubber sheet includes a main body, a seating portion, and a deformation restricting portion. The main body is formed into an arc shape or an annular shape. The seating portion is formed into a groove shape at the main body. A coil spring is seated on the seating portion. The deformation restricting portion is formed to project outside in a radial direction from an outer periphery of the main body, at a position on which a terminal portion of the coil spring is seated of the main body. The deformation restricting portion restricts deformation of the main body.

DESCRIPTION OF EMBODIMENTS

Figure 1:
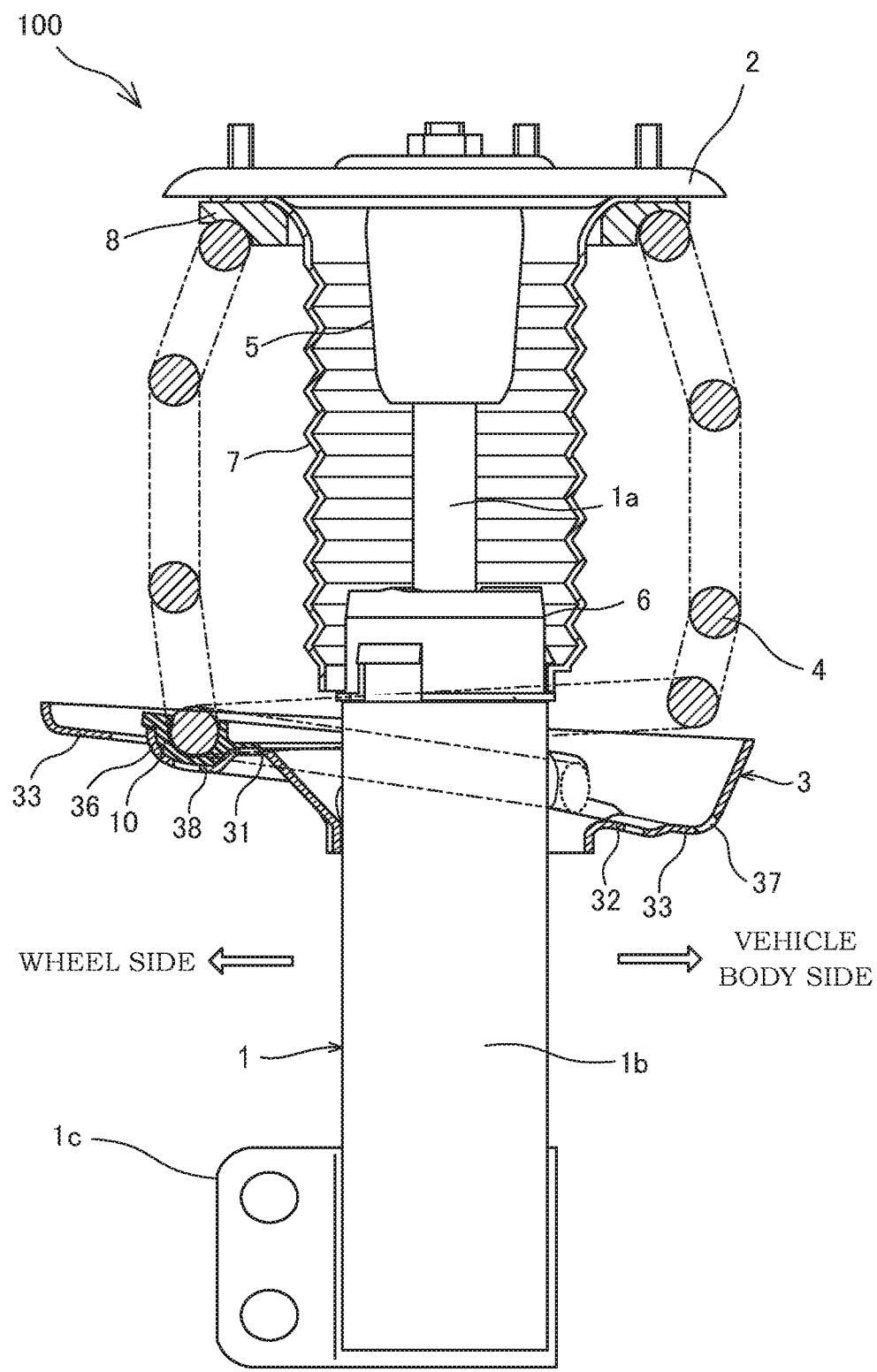
FIG. 1 is a partial cross-sectional view of a suspension device according to an embodiment of the present invention.
Figure 2:
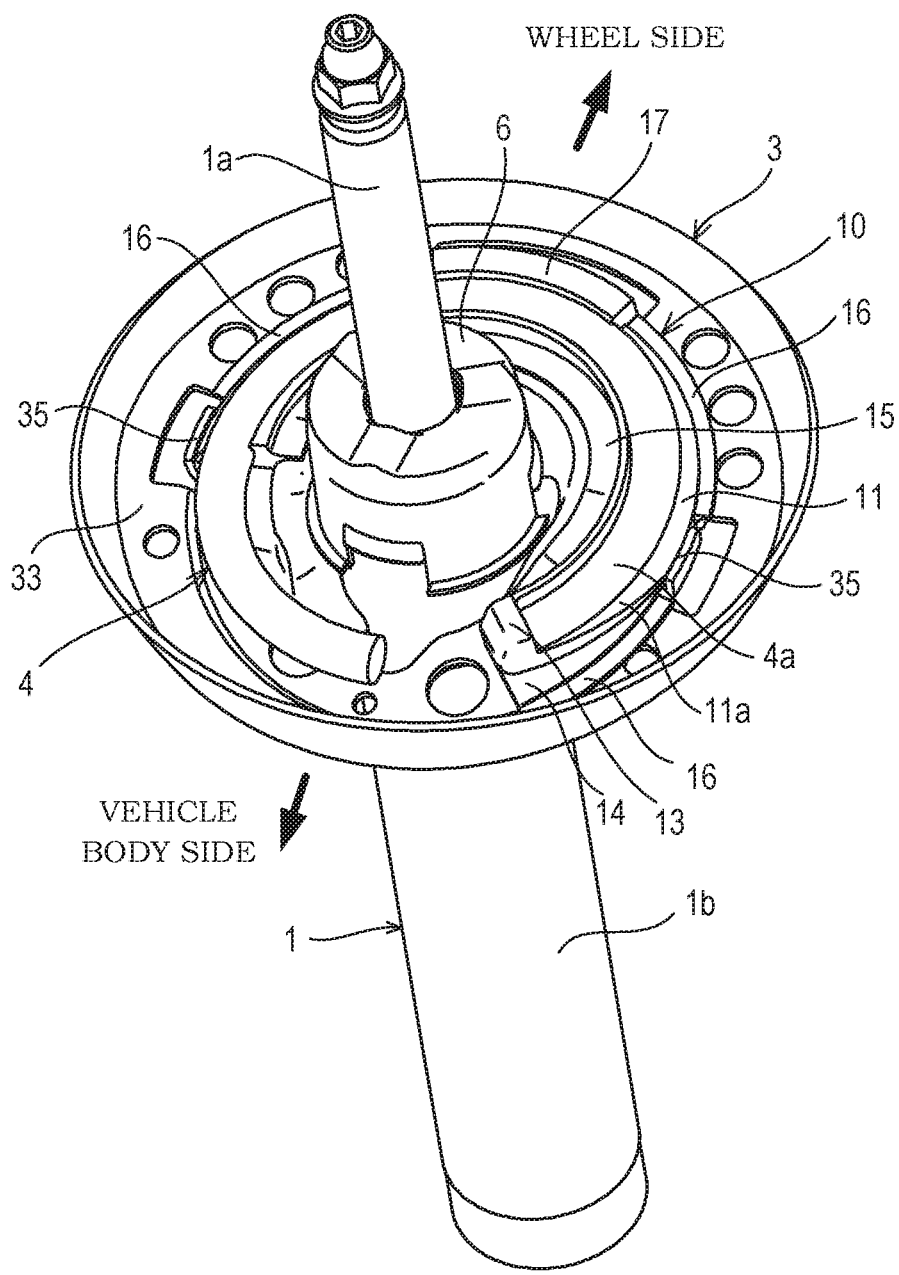
FIG. 2 is a partial perspective view of the suspension device according to the embodiment of the present invention.

The following describes a rubber sheet 10 and a suspension device 100 according to an embodiment of the present invention with reference to the attached drawings.

First, with reference to FIG. 1, the suspension device 100 in which the rubber sheet 10 according to the embodiment of the present invention is incorporated will be described.

The suspension device 100 is a device, which is mounted on an automobile (not illustrated), that positions a wheel (not illustrated), generates damping force to absorb impact and vibration received from a road surface during the vehicle running and stably suspends the vehicle body.

The suspension device 100 includes a strut-type shock absorber 1, an upper mount 2, a spring guide 3, a coil spring 4, a bump stopper 5, a bump cap 6, and a dust boot 7. The shock absorber 1 is disposed between the vehicle body and the wheel. The upper mount 2 is mounted on a distal end of a piston rod 1a of the shock absorber 1. The spring guide 3 is mounted on an outer peripheral surface of a cylinder 1b of the shock absorber 1. The coil spring 4 is disposed between the upper mount 2 and the spring guide 3. The bump stopper 5 is fitted into the piston rod 1a to restrict stroke at a shrinkage side of the shock absorber 1. The bump cap 6 is a capping member fitted into an end portion at the piston rod 1a side of the cylinder 1b. The dust boot 7 is a pipe-shaped cover member that protects the piston rod 1a.

The cylinder 1b has an end portion at the opposite side of the piston rod 1a. At this end portion of the cylinder 1b, a bracket 1c for coupling a hub carrier (not illustrated) that holds the wheel to the shock absorber 1 is disposed. The shock absorber 1 is coupled to the vehicle body by the upper mount 2 and is coupled to the hub carrier by the bracket 1c to be assembled on the vehicle. The shock absorber 1 configured as described above is configured to generate the damping force when the piston rod 1a moves in an axial direction (the vertical direction in FIG. 1) with respect to the cylinder 1b. The suspension device 100 quickly damps the vibration of the vehicle body by this damping force of the shock absorber 1.

The coil spring 4 is sandwiched between the upper mount 2 and the spring guide 3 in a compressed state to bias the shock absorber 1 in an extending direction. Between the upper mount 2 and the coil spring 4, an upper-side rubber sheet 8 is disposed. This keeps the upper mount 2 from not directly abutting on the coil spring 4. Between the spring guide 3 and the coil spring 4, the arc-shaped rubber sheet 10 is disposed. This keeps the spring guide 3 from not directly abutting on the coil spring 4.

The following describes the spring guide 3 with reference to FIG. 1 to FIG. 4.

The spring guide 3 is a metallic dish-shaped member fixed to an outer periphery of the cylinder 1b for supporting the coil spring 4. The spring guide 3 includes an opening 30, a protrusion 31, an annular-shaped mounting portion 32, an annular-shaped outer circumference 33, and an annular-shaped support wall 34. The opening 30 is for inserting the cylinder 1b. The protrusion 31 is formed to project to the upper mount 2 side so as to surround the opening 30. The mounting portion 32 is formed to surround the protrusion 31 and to have an arc groove 38 to which the rubber sheet 10 is fitted. The outer circumference 33 is formed at an outside in a radial direction of the mounting portion 32. The support wall 34 extends from the outer circumference 33 to the upper mount 2 side to be formed to surround the outer circumference 33.

Figure 4:
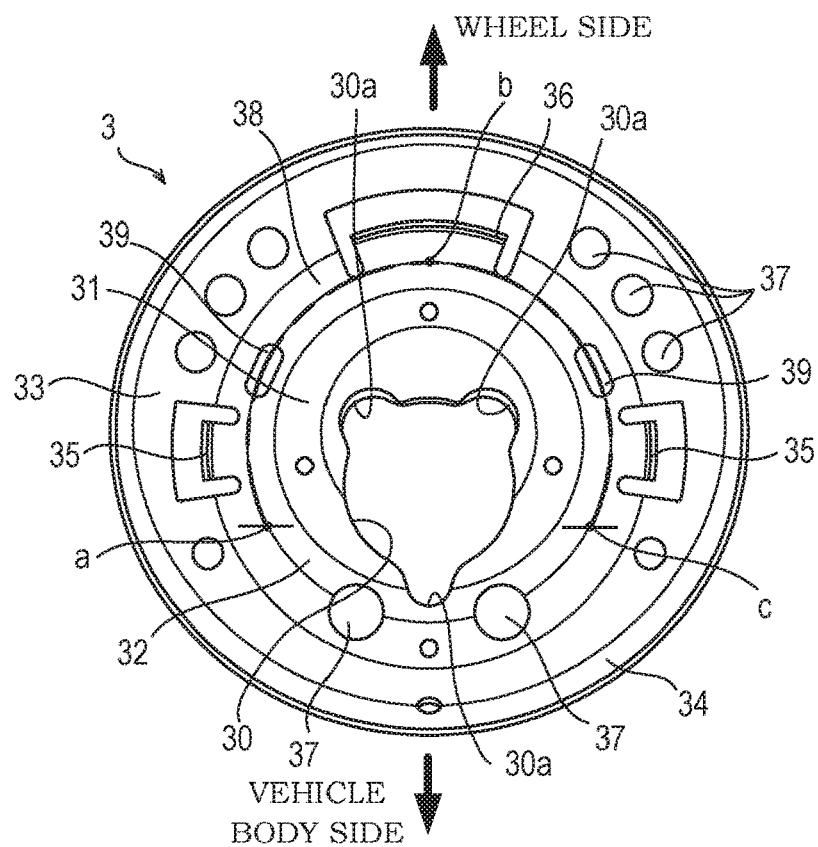
FIG. 4 is a plan view of the spring guide according to the embodiment of the present invention.

As illustrated in FIG. 1 and FIG. 4, when the spring guide 3 is fixed to the outer periphery of the cylinder 1b, the opening 30 is formed to be at a position eccentrically to the vehicle body side from the center of the spring guide 3. The spring guide 3 is fixed to the outer periphery of the cylinder 1b by welding the opening 30 to the outer periphery of the cylinder 1b. At the opening 30, a plurality of cutouts 30a are disposed. The cutout 30a functions as a drainage when water or the like is accumulated in the spring guide 3.

Figure 3:
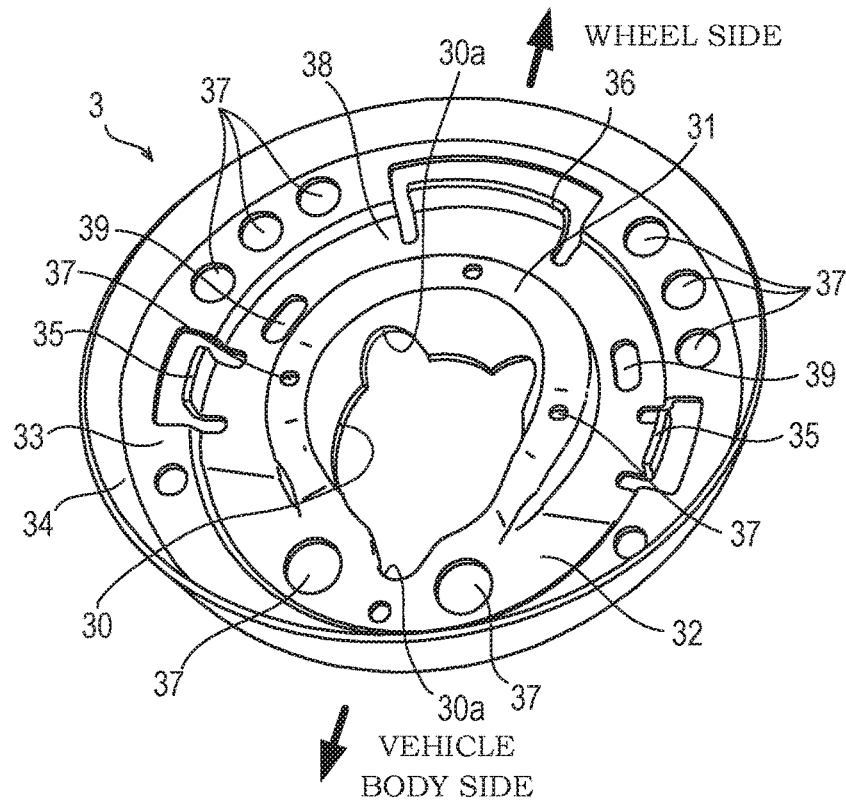
FIG. 3 is a perspective view of a spring guide according to the embodiment of the present invention.

As illustrated in FIG. 1 and FIG. 3, the protrusion 31 is formed to project to the upper mount 2 side (the upper side in FIG. 1). The protrusion 31 is formed into an arc shape such that both end portions in a circumferential direction are positioned to the vehicle body side, when the spring guide 3 is mounted on the outer periphery of the cylinder 1b.

Figure 5:
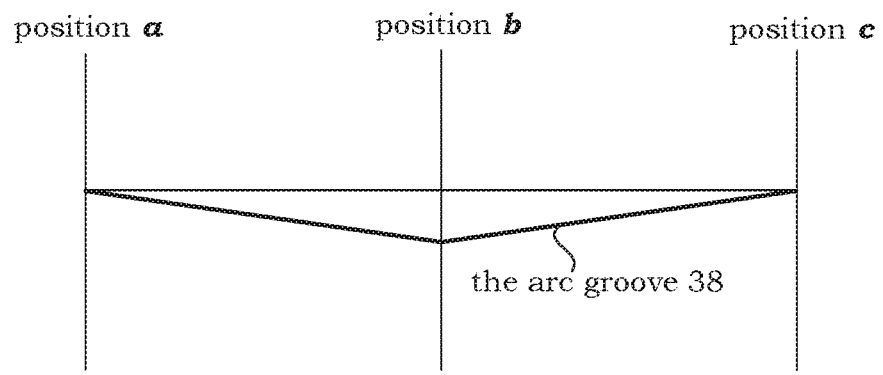
FIG. 5 is a view illustrating a change of a depth of a seat surface of the spring guide according to the embodiment of the present invention.

The mounting portion 32 is formed into an annular shape so as to be depressed with respect to the outer circumference 33. The mounting portion 32 has the arc groove 38 to which the rubber sheet 10 is fitted. The arc groove 38 is formed as an arc-shaped groove between the protrusion 31 and the outer circumference 33. As illustrated in FIG. 4 and FIG. 5, the arc groove 38 is formed such that a depth of the groove is deepest near the arc center (position b) positioned at the wheel side, and the depth of the groove shallows toward the vehicle body side, that is, both end portions (position a and position c) in the circumferential direction of the arc.

At the arc groove 38, a plurality of engaging holes 39 are formed. With the engaging holes 39, protrusions (not illustrated) formed on a bottom surface of the rubber sheet 10 are engaged. This engagement of the protrusions of the rubber sheet 10 with the engaging holes 39 prevents displacement of the rubber sheet 10 against the spring guide 3.

The arc groove 38 further includes two first lock pieces 35 and a second lock piece 36 that are formed by standing at the outer periphery. Each of the two first lock pieces 35 is formed at a position opposed to a vicinity of an end portion in a circumferential direction of the rubber sheet 10, in a state where the arc-shaped rubber sheet 10 is fitted to the arc groove 38. The second lock piece 36 is formed at a position opposed to a vicinity of a center portion in the circumferential direction of the rubber sheet 10, in the state where the arc-shaped rubber sheet 10 is fitted to the arc groove 38. Thus, in the state where the rubber sheet 10 is fitted to the arc groove 38, even if load to the outside in the radial direction acts on the rubber sheet 10 in accordance with extension and contraction of the coil spring 4, the outer periphery of the rubber sheet 10 abuts on the first lock pieces 35 and the second lock piece 36. Thus, movement to the outside in the radial direction is restricted. Accordingly, the first lock pieces 35 and the second lock piece 36 prevent the displacement to the outside in the radial direction of the rubber sheet 10.

At the protrusion 31, the mounting portion 32, and the outer circumference 33, a plurality of through-holes 37 are formed. The through-hole 37 functions as a punched portion for weight reduction, and functions as a drain hole when water or the like is accumulated in the spring guide 3.

The following describes the rubber sheet 10 with reference to FIG. 2, and FIG. 6 to FIG. 9.

The rubber sheet 10 is made of a material having elasticity such as rubber. The rubber sheet 10 includes a main body 11, an arc-shaped seating portion 12, a stopper portion 13, and a deformation restricting portion 14. The main body 11 is formed into an arc shape to be fitted to the arc groove 38 of the spring guide 3. The seating portion 12 is formed into a groove shape at the main body 11. The coil spring 4 is seated on the seating portion 12. The stopper portion 13 is formed at one end portion in the circumferential direction of the main body 11, and abuts on an end surface of a terminal portion 4a of the coil spring 4 to restrict movement of the coil spring 4. The deformation restricting portion 14 is formed to project outside in the radial direction from the outer periphery of the main body 11 at an end portion 11a of the main body 11. The end portion 11a supports the terminal portion 4a of the coil spring 4.

Figure 9:
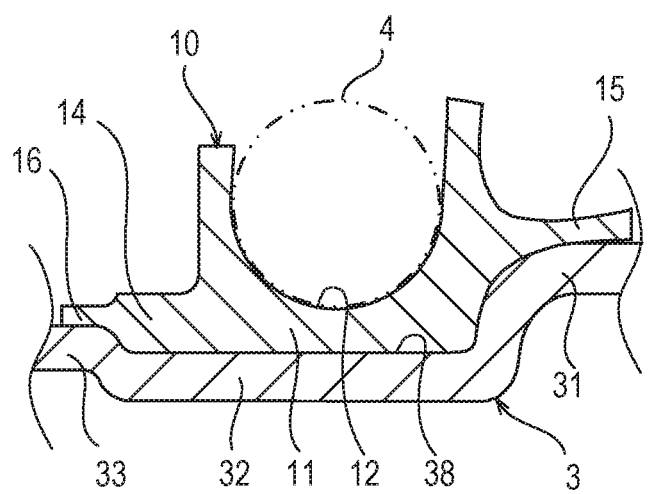
FIG. 9 is a partial cross-sectional view taken along the line I-I in FIG. 8.

As illustrated in FIG. 9, the seating portion 12 is formed such that its cross-sectional surface curves along a cross-sectional shape of the coil spring 4.

At the rubber sheet 10, the main body 11 is fitted to the arc groove 38 of the spring guide 3 at a part at which the deformation restricting portion 14 is not formed, and the main body 11 and the deformation restricting portion 14 are fitted to the arc groove 38 of the spring guide 3 at a part at which the deformation restricting portion 14 is formed. In a state where the rubber sheet 10 is fitted to the arc groove 38 of the spring guide 3, the main body 11 and the deformation restricting portion 14 of the rubber sheet 10 abut on a bottom surface of the arc groove 38. It should be noted that the rubber sheet 10 may have a shape where only the main body 11 is fitted to the arc groove 38 and the deformation restricting portion 14 is abutted on the outer circumference 33 without being fitted to the arc groove 38.

The rubber sheet 10 further includes an inner-peripheral-side lip 15 and an outer-peripheral-side lip 16 at an inner periphery and the outer periphery. The inner-peripheral-side lip 15 is formed to project inside in the radial direction from a side surface at the inner peripheral side of the main body 11. The outer-peripheral-side lip 16 is formed to project from a side surface at the outer peripheral side of the main body 11 and an outer periphery of the deformation restricting portion 14. In the state where the rubber sheet 10 is fitted to the arc groove 38 of the spring guide 3, the inner-peripheral-side lip 15 abuts on the protrusion 31 so as to cover the protrusion 31 from above, and the outer-peripheral-side lip 16 abuts on the outer circumference 33 so as to cover the outer circumference 33 from above (see FIG. 9). Thus, even if the coil spring 4 extends and contracts to create a clearance between the main body 11 of the rubber sheet 10 and the arc groove 38 of the spring guide 3, the inner-peripheral-side lip 15 and the outer-peripheral-side lip 16 have abutted on the protrusion 31 and the outer circumference 33 of the spring guide 3 so as to cover the protrusion 31 and the outer circumference 33 from above respectively. This can prevent a foreign matter or the like from invading between the main body 11 of the rubber sheet 10 and the arc groove 38 of the spring guide 3. It should be noted that, by forming the inner-peripheral-side lip 15 and the outer-peripheral-side lip 16 inclined to the protrusion 31 and the outer circumference 33 sides, the inner-peripheral-side lip 15 and the outer-peripheral-side lip 16 are pressed to and abutted on the protrusion 31 and the outer circumference 33. Thus, even if the main body 11 of the rubber sheet 10 deforms, the clearance is less likely to occur between the inner-peripheral-side lip 15 and the protrusion 31, and between the outer-peripheral-side lip 16 and the outer circumference 33. Accordingly, this can further prevent the foreign matter or the like from invading between the main body 11 of the rubber sheet 10 and the arc groove 38 of the spring guide 3.

Figure 6:
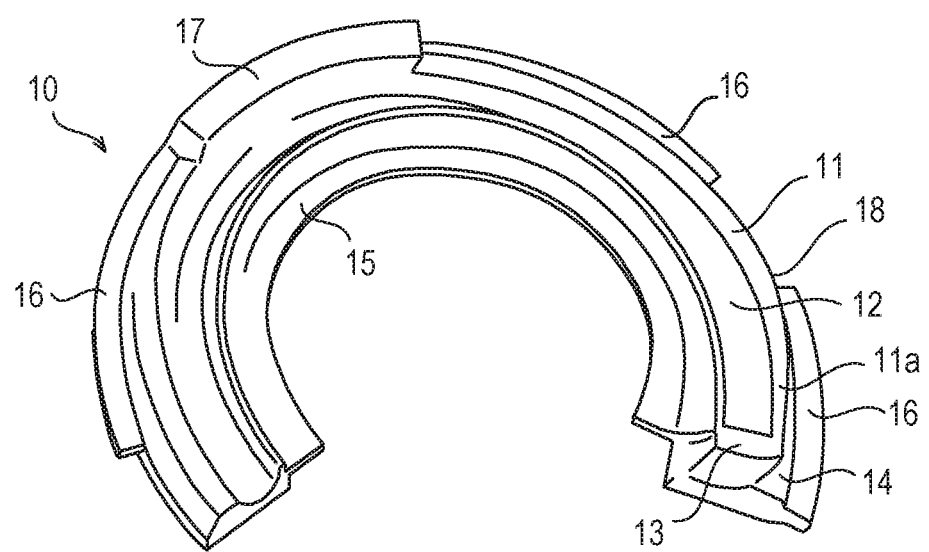
FIG. 6 is a perspective view of a rubber sheet according to the embodiment of the present invention.
Figure 7:
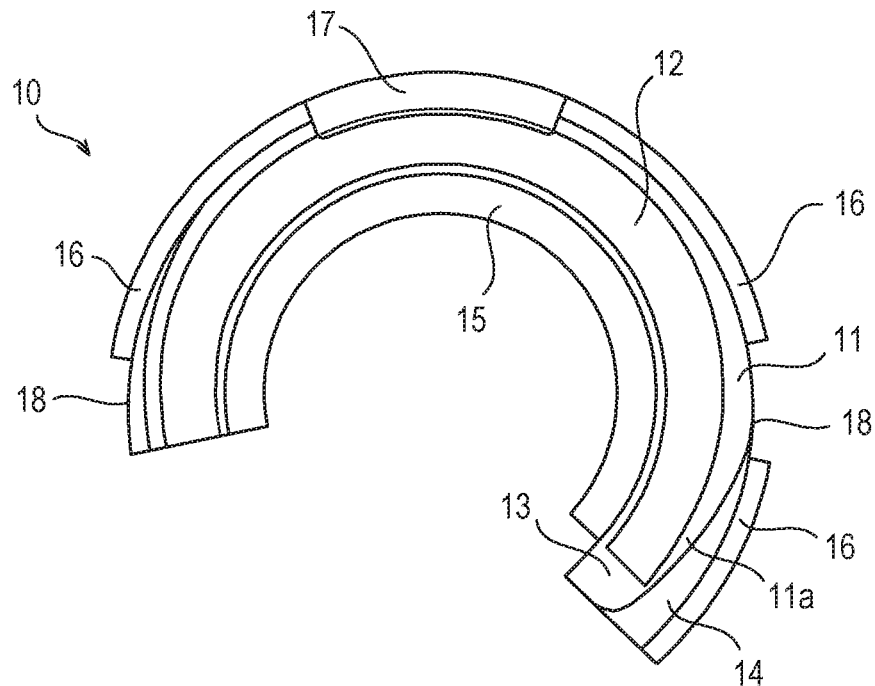
FIG. 7 is a plan view of the rubber sheet according to the embodiment of the present invention.
Figure 8:
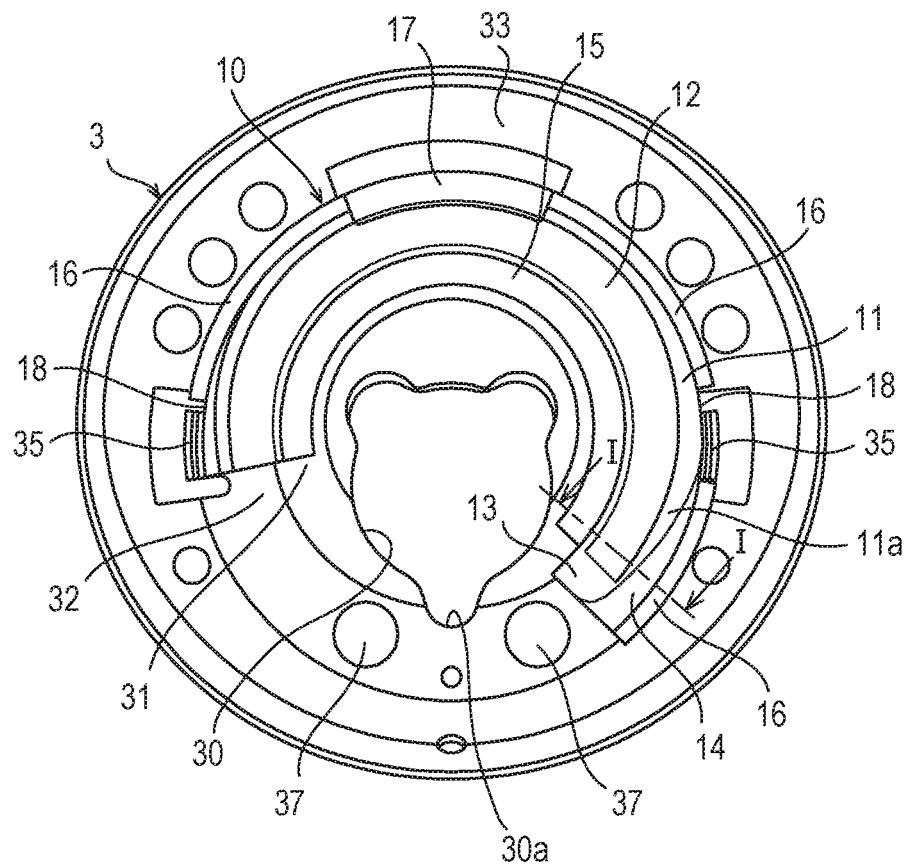
FIG. 8 is a view illustrating a state where the rubber sheet has been mounted on the spring guide according to the embodiment of the present invention.

As illustrated in FIG. 6 to FIG. 8, at the outer-peripheral-side lip 16, cutouts 18 are formed at positions opposed to the first lock pieces 35 of the spring guide 3. At the outer-peripheral-side lip 16, a covering portion 17 as covering the second lock piece 36 is formed integrally with the outer-peripheral-side lip 16 at a position opposed to the second lock piece 36 of the spring guide 3. Disposing the covering portion 17 can prevent the foreign matter or the like from invading between the main body 11 of the rubber sheet 10 and the arc groove 38 of the spring guide 3 through the second lock piece 36. It should be noted that, instead of the cutouts 18, covering portions as covering the first lock pieces 35 may be disposed at the positions opposed to the first lock pieces 35 of the outer-peripheral-side lip 16.

The rubber sheet 10 is positioned with respect to the spring guide 3 such that protrusions (not illustrated) formed on a surface abutting on the arc groove 38 are engaged with the engaging holes 39 of the spring guide 3, and the cutouts 18 and the covering portion 17 are engaged with the first lock pieces 35 and the second lock piece 36 of the spring guide 3 respectively. Then, the rubber sheet 10 is fitted to the arc groove 38.

Typically, at the suspension device, large load acts on the wheel side compare with the vehicle body side. If the terminal portion 4a of the coil spring 4 is arranged at a position that receives such large load, large load locally acts on the end portion 11a of the rubber sheet 10 that supports the terminal portion 4a of the coil spring 4, and the spring guide 3. In view of this, at the suspension device 100, the terminal portion 4a is arranged at a position apart from the wheel side (inside the vehicle body) (see FIG. 2) such that a part other than the terminal portion 4a of the coil spring 4 receives the large load as described above. By arranging the coil spring 4 as described above, the large load can be received at a long area (the part other than the terminal portion 4a) of a wire rod in the coil spring 4 at the wheel side. Since a large load is not locally acted on the rubber sheet 10 and the spring guide 3, it is possible to prevent the rubber sheet 10 and the spring guide 3 from being damaged. Furthermore, at the terminal portion 4a, the load that acts on the end portion 11a of the rubber sheet 10 via the terminal portion 4a of the coil spring 4 is reduced. Thus, the end portion 11a of the rubber sheet 10 becomes less likely to deform.

The following describes an action of the deformation restricting portion 14 of the rubber sheet 10.

When the wheel vibrates in a vertical direction, for example, by unevenness of the road surface during the vehicle running, the shock absorber 1 and the coil spring 4 of the suspension device 100 extend and contract in accordance with vertical motion of the wheel. When the coil spring 4 contracts, large load acts on the terminal portion 4a of the coil spring 4 toward the outside in the radial direction. If the large load acts on the terminal portion 4a of the coil spring 4, stress to deform the rubber sheet 10 as twisting toward the outside in the radial direction acts on the end portion 11a of the rubber sheet 10. The deformation restricting portion 14 is formed to project outside in the radial direction from the outer periphery of the main body 11 to abut on the arc groove 38 of the spring guide 3. Thus, the deformation restricting portion 14 restricts the deformation of the main body 11 of the rubber sheet 10 as twisting toward the outside in the radial direction, against the load from the coil spring 4.

The spring guide 3 is, as described above, formed such that the opening 30 is positioned eccentrically to the vehicle body side from the center of the spring guide 3. As illustrated in FIG. 1, the spring guide 3 is mounted such that the vehicle body side is lowered compared with the wheel side. Thus, it is necessary to dispose the cutout 30a for drain at the vehicle body side. In view of this, at the spring guide 3, it is difficult to ensure a width in the radial direction at the vehicle body side at the mounting portion 32. Thus, it is not easy to deepen the depth at the vehicle body side of the arc groove 38. As described above, the terminal portion 4a of the coil spring 4 is arranged at the vehicle body side (inside the vehicle body). Thus, in the state where the rubber sheet 10 is fitted to the arc groove 38, the end portion 11a in the circumferential direction of the rubber sheet 10 that supports the terminal portion 4a of the coil spring 4 will be positioned near an end portion (position c in FIG. 4) at which the groove depth of the arc groove 38 of the spring guide 3 is shallow. Thus, when the end portion 11a of the rubber sheet 10 is positioned at the position at which the depth of the arc groove 38 is shallow, a sidewall of the arc groove 38 cannot support the end portion 11a of the rubber sheet 10. Accordingly, the end portion 11a becomes likely to deform as twisting toward the outside in the radial direction. However, the rubber sheet 10 restricts the deformation of the main body 11 of the rubber sheet 10 as twisting to the outside in the radial direction against the load from the coil spring 4, since, as described above, the deformation restricting portion 14 is formed to project outside in the radial direction from the outer periphery of the main body 11 to abut on the arc groove 38 of the spring guide 3.

According to the above-described embodiment, the following described effect is provided.

At the rubber sheet 10, the deformation restricting portion 14 formed to project outside in the radial direction from the outer periphery of the main body 11 is disposed at the end portion 11a of the main body 11. Accordingly, when the coil spring 4 contracts, even if the large load acts on the terminal portion 4a of the coil spring 4, the deformation restricting portion 14 restricts the deformation of the end portion 11a of the rubber sheet 10 as twisting outside in the radial direction. Thus, there is no possibility that the coil spring 4 is removed from the rubber sheet 10. Accordingly, the rubber sheet 10 can stably support the coil spring 4.

If the load in the radial direction acts on the rubber sheet 10 in accordance with the extension and contraction of the coil spring 4, friction resistance occurs between the main body 11 of the rubber sheet 10 and the arc groove 38 of the spring guide 3. Furthermore, since the deformation restricting portion 14 of the rubber sheet 10 abuts on the arc groove 38 of the spring guide 3, in addition to the friction resistance between the main body 11 of the rubber sheet 10 and the arc groove 38 of the spring guide 3, friction resistance will also occur between the deformation restricting portion 14 and the arc groove 38. Accordingly, even if the load in the radial direction acts on the rubber sheet 10, displacement of the rubber sheet 10 on the spring guide 3 can be further prevented.

At the rubber sheet 10, its end portion 11a in the circumferential direction is positioned at the end portion (position c) at which the groove depth of the arc groove 38 of the spring guide 3 is shallow, and the deformation restricting portion 14 is fitted to the arc groove 38 as abutting on the arc groove 38. By fitting the deformation restricting portion 14 on the arc groove 38 as described above, the end portion 11a of the rubber sheet 10 will be positioned at the end portion at which the depth of the arc groove 38 is shallow. In such configuration, when the end portion of the rubber sheet 10 receives the load from the terminal portion 4a of the coil spring 4, the end portion of the rubber sheet 10 becomes likely to be removed from the arc groove 38. However, as described above, the deformation restricting portion 14 of the rubber sheet 10 abuts on the arc groove 38 of the spring guide 3, and the friction resistance occurs between them. This can prevent the end portion 11a of the rubber sheet 10 from being displaced to be removed from the arc groove 38.

The following describes the configuration, the action, and the effect according to the embodiment of the present invention as a whole.

The rubber sheet 10 is disposed between the coil spring 4 and the spring guide 3. The coil spring 4 elastically supports the vehicle body. The spring guide 3 supports the lower end portion of the coil spring 4. The rubber sheet 10 includes the main body 11, the seating portion 12, and the deformation restricting portion 14. The main body 11 is formed into the arc shape or the annular shape. The seating portion 12 is formed into the groove shape at the main body 11. The coil spring 4 is seated on the seating portion 12. The deformation restricting portion 14 is formed to project outside in the radial direction from the outer periphery of the main body 11 at a position on which the terminal portion 4a of the coil spring 4 is seated of the main body 11. The deformation restricting portion 14 restricts the deformation of the main body 11.

In this configuration, even if the coil spring 4 contracts, and then the load toward the outside in the radial direction acts on the terminal portion 4a, the deformation restricting portion 14 restricts the deformation as twisting outside in the radial direction of the end portion 11a on which the terminal portion 4a of the coil spring 4 is seated of the rubber sheet 10. Thus, there is no possibility that the coil spring 4 is removed from the rubber sheet 10, and the coil spring 4 can be stably supported by the rubber sheet 10.

The deformation restricting portion 14 is formed to abut on the spring guide 3.

In this configuration, since the friction resistance occurs between the deformation restricting portion 14 and the arc groove 38 of the spring guide 3, in addition to the friction resistance between the main body 11 of the rubber sheet 10 and the arc groove 38 of the spring guide 3, it is possible to further prevent the sheet 10 from being displaced on the spring guide 3.

The rubber sheet 10 has the arc shape. The deformation restricting portion 14 is formed at the end portion 11a in a circumferential direction of the rubber sheet 10.

In this configuration, the rubber sheet 10 has the arc shape. The deformation restricting portion 14 is formed at the end portion 11a in the circumferential direction of the rubber sheet 10. Since the rubber sheet 10 has the arc shape, its end portion 11a is likely to deform. Even in such configuration, since the deformation restricting portion 14 is formed at the end portion 11a in the circumferential direction of the rubber sheet 10, the deformation of the rubber sheet 10 can be effectively restricted.

The rubber sheet 10 further includes the lips (the inner-peripheral-side lip 15 and the outer-peripheral-side lip 16) formed to project from respective side surfaces of the inner periphery and the outer periphery of the main body 11 in the radial direction. The lips (the inner-peripheral-side lip 15 and the outer-peripheral-side lip 16) abut on the spring guide 3 to prevent the foreign matter from invading between the main body 11 and the spring guide 3.

In this configuration, even if the clearance occurs between the rubber sheet 10 and the spring guide 3, the lips (the inner-peripheral-side lip 15 and the outer-peripheral-side lip 16) abut on the spring guide 3. This can prevent the foreign matter from invading between the main body 11 and the spring guide 3.

The suspension device 100 includes the rubber sheet 10, the shock absorber 1 disposed between the vehicle body and the wheel, the upper mount 2 mounted on the distal end of the rod (the piston rod 1a) of the shock absorber 1, the spring guide 3 mounted on the outer peripheral surface of the shock absorber 1, and the coil spring 4 disposed between the upper mount 2 and the spring guide 3.

In this configuration, the rubber sheet 10 is applicable to the suspension device 100.

The terminal portion 4a of the coil spring 4 is positioned inside the vehicle body.

In this configuration, the terminal portion 4a of the coil spring 4 is at a position apart from the wheel side on which the load most acts. Accordingly, this can reduce the load that acts on the end portion 11a of the rubber sheet 10 via the terminal portion 4a of the coil spring 4.

At the spring guide 3, the arc groove 38 is formed. The arc groove 38 has the depth that shallows toward the end portion in the circumferential direction. The rubber sheet 10 has the arc shape, and has the end portion in the circumferential direction positioned at the end portion of the arc groove 38 of the spring guide 3. The deformation restricting portion 14 is fitted to the arc groove 38 as abutting on the arc groove 38. The coil spring 4 is supported to the rubber sheet 10 such that the terminal portion 4a of the coil spring 4 is positioned at the end portion 11a of the rubber sheet 10.

In this configuration, since the end portion 11a in the circumferential direction of the rubber sheet 10 at which the terminal portion 4a of the coil spring 4 is positioned is positioned at the end portion at which the depth of the arc groove 38 is shallow, when the end portion 11a of the rubber sheet 10 receives the load from the terminal portion 4a of the coil spring 4, the end portion 11a of the rubber sheet 10 is likely to be displaced to be removed from the arc groove 38. However, the deformation restricting portion 14 of the rubber sheet 10 abuts on the arc groove 38 of the spring guide 3 to generate the friction resistance between them.

This can prevent the end portion 11a of the rubber sheet 10 from being displaced to be removed from the arc groove 38.

Embodiments of this invention were described above, but the above embodiments are merely examples of applications of this invention, and the technical scope of this invention is not limited to the specific constitutions of the above embodiments.

For example, the rubber sheet 10 may have an annular shape. The deformation restricting portion 14 may have a certain clearance with the arc groove 38 insofar as the deformation restricting portion 14 can abut on the arc groove 38. In this case, the deformation of the rubber sheet 10 will be allowed to some extent. Furthermore, the arc groove 38 may be constituted as an annular-shaped groove. For example, a stiffener may be buried at the deformation restricting portion 14.

This application claims priority based on Japanese Patent Application No. 2015-72912 filed with the Japan Patent Office on Mar. 31, 2015, the entire contents of which are incorporated into this specification.

The invention claimed is:

1. A suspension device, comprising:
   a shock absorber disposed between a vehicle body and a wheel;
   an upper mount mounted on a distal end of a rod of the shock absorber;
   a spring guide mounted on an outer peripheral surface of the shock absorber;
   a coil spring disposed between the upper mount and the spring guide, the coil spring elastically supporting the vehicle body; and
   a rubber sheet disposed between the coil spring and the spring guide, the rubber sheet being formed into an arc shape, wherein
   the spring guide has an arc groove,
   the rubber sheet includes:
      a main body;
      a seating portion formed into a groove shape at the main body, the coil spring being configured to be seated on the seating portion; and
      a deformation restricting portion formed to project outside in a radial direction from an outer periphery of the main body at a position, on which a terminal portion of the coil spring is seated, of the main body, the deformation restricting portion being configured to restrict deformation of the main body, and
   the main body has an arc shape and has end portions of the main body in a circumferential direction of the rubber sheet are positioned at end portions of the arc groove, and the deformation restricting portion is fitted to a bottom surface of the arc groove as abutting on the arc groove,
   the coil spring is supported to the rubber sheet such that the terminal portion of the coil spring is positioned at one of the end portions of the main body, and
   the arc groove has a depth that is decreased toward the end portions of the arc groove in the circumferential direction.

2. The suspension device according to claim 1, wherein the deformation restricting portion is formed at one of the end portions of the main body.

3. The suspension device according to claim 1, the rubber sheet further comprising:
   lips formed to project from respective side surfaces of an inner periphery and the outer periphery of the main body in the radial direction, the lips abutting on the spring guide to prevent a foreign matter from invading between the main body and the spring guide.

4. The suspension device according to claim 1, wherein the terminal portion of the coil spring is positioned inside the vehicle body.

5. The suspension device according to claim 1, wherein the deformation restricting portion is formed only in a part of the main body in the circumferential direction.

* * * * *